United States Patent [19]

Darnell et al.

[11] 4,105,755

[45] Aug. 8, 1978

[54] HYDROGEN PRODUCTION

[75] Inventors: Alfred J. Darnell; William E. Parkins, both of Woodland Hills, Calif.

[73] Assignee: Rockwell International Corporation, El Segundo, Calif.

[21] Appl. No.: 847,202

[22] Filed: Oct. 31, 1977

Related U.S. Application Data

[63] Continuation-in-part of Ser. No. 716,320, Aug. 20, 1976, abandoned.

[51] Int. Cl.$^2$ ............................................. C01B 1/03
[52] U.S. Cl. ............................... 423/648 R; 423/486; 423/650; 204/128
[58] Field of Search ............... 423/648, 650, 652, 655, 423/482, 486; 204/128, 129

[56] References Cited

U.S. PATENT DOCUMENTS

| | | | |
|---|---|---|---|
| 1,485,816 | 3/1924 | Rosenstein | 423/486 |
| 1,868,946 | 7/1932 | Low | 423/482 |
| 1,870,308 | 8/1932 | Behrman | 423/486 |
| 1,921,388 | 8/1933 | Heath et al. | 423/486 |
| 3,365,276 | 1/1968 | Childs et al. | 423/648 R |
| 3,458,411 | 7/1969 | Grotheer et al. | 204/128 |
| 3,929,980 | 12/1975 | Abraham et al. | 423/648 R |

FOREIGN PATENT DOCUMENTS

2,445,953  5/1975  Fed. Rep. of Germany ............ 423/648

25,073 of  1894  United Kingdom ..................... 423/486

*Primary Examiner*—Edward J. Meros
*Attorney, Agent, or Firm*—L. Lee Humphries; Henry Kolin; Clark E. DeLarvin

[57] ABSTRACT

The production of hydrogen by reacting an ash containing material with water and at least one halogen selected from the group consisting of chlorine, bromine and iodine to form reaction products including carbon dioxide and a corresponding hydrogen halide. The hydrogen halide is decomposed to separately release the hydrogen and the halogen. The halogen is recovered for reaction with additional carbonaceous materials and water, and the hydrogen is recovered as a salable product. In a preferred embodiment the carbonaceous material, water and halogen are reacted at an elevated temperature. In accordance with another embodiment, a continuous method for the production of hydrogen is provided wherein the carbonaceous material, water and at least one selected halogen are reacted in one zone, and the hydrogen halide produced from the reaction is decomposed in a second zone, preferably by electrolytic decomposition, to release the hydrogen for recovery and the halogen for recycle to the first zone. There also is provided a method for recovering any halogen which reacts with or is retained in the ash constituents of the carbonaceous material.

14 Claims, 1 Drawing Figure

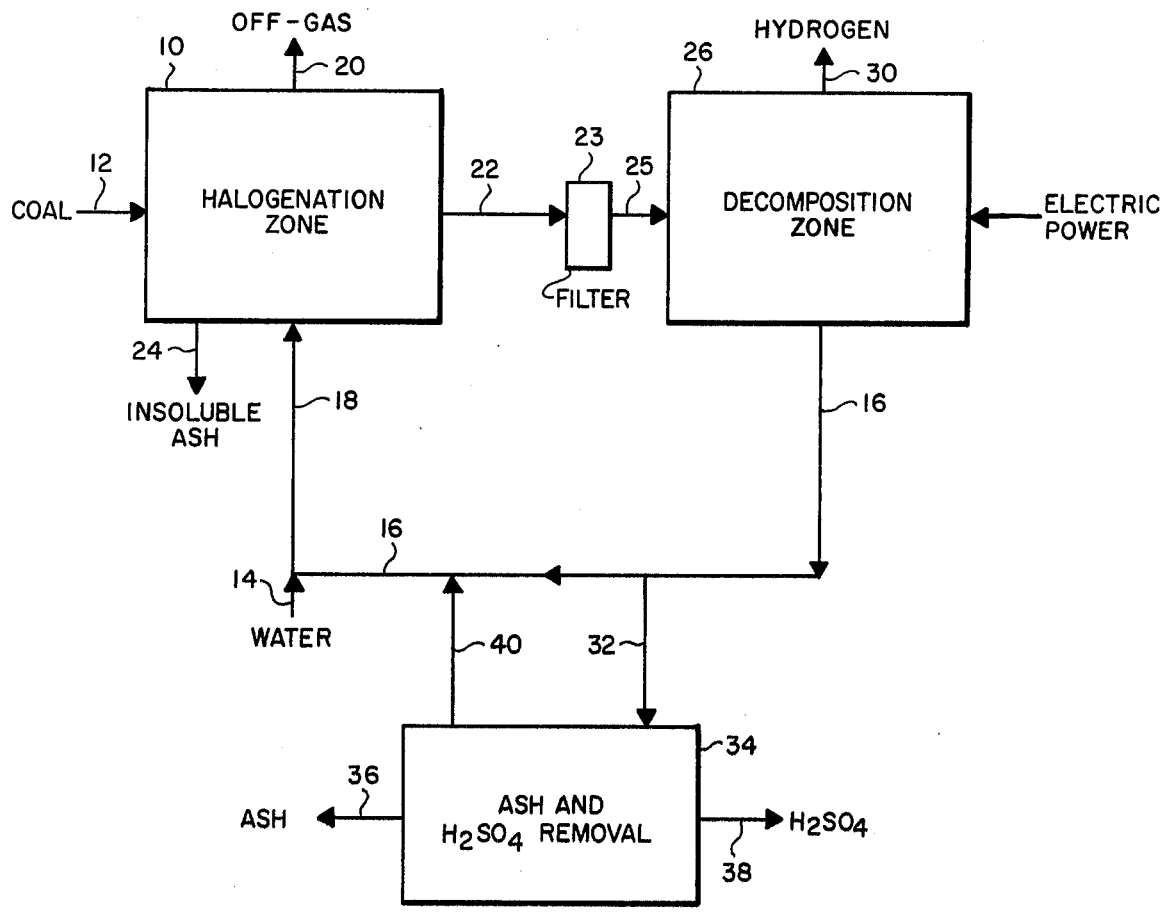

HYDROGEN PRODUCTION

CROSS REFERENCES TO RELATED APPLICATIONS

This application is a continuation-in-part of application Ser. No. 716,320 filed Aug. 20, 1976, now abandoned.

BACKGROUND OF THE INVENTION

1. Field of the Invention

Broadly, the present invention relates to the production of gaseous hydrogen. More particularly, it relates to a two-step cyclic process which utilizes a halogen for the production of hydrogen from carbonaceous materials and water.

2. Prior Art

The United States presently consumes more energy than it produces. A large portion of the energy consumed is in the form of oil and natural gas; a major portion of the oil being imported. The reserves of oil and natural gas in the United States are being rapidly depleted. Thus, the country is becoming even more dependent upon imported petroleum and may soon have to import significant quantities of natural gas. The present principal uses of hydrogen are for the production of ammonia to make fertilizer, the production of explosives and hydrocracking of hydrocarbonaceous materials. It has been proposed that hydrogen be produced and used as a source of fuel and as a chemical feedstock to reduce the country's dependence on petroleum and natural gas.

The principal source of hydrogen produced in the United States comes from the steam-hydrocarbon process wherein a hydrocarbon feed material is reacted with steam to produce a product gas comprising carbon monoxide, hydrogen and carbon dioxide. The steam-hydrocarbon process is complex and requires that the product gas be treated to remove the carbon monoxide and carbon dioxide to obtain substantially pure hydrogen. In addition, if the hydrocarbon feed material contains sulfur, then the feed material or product gas must be treated to remove the sulfur to provide a non-polluting hydrogen gas product.

A high purity hydrogen product is obtained from the electrolysis of water. The theoretical voltage required to decompose water is reported as being 1.23 volts at atmospheric termperature and pressure. Thus, assuming 100% current efficiency and the theoretical decomposition voltage, the production of 1000 scf of hydrogen would require approximately 78.0 kwhr of direct current. In actual practice, however, the minimum voltage required to produce gaseous hydrogen from a solution of potassium of sodium hydroxide is approximately 1.7 volts, while the actual operation voltage of commercial cells is reported as ordinarily in the range of from about 2.0 to 2.5 volts. In addition, the electrolysis of water requires direct current (dc) and most electrical power is produced and supplied to plants as alternating current (ac). Accordingly, a rectifier must be used to convert the ac to dc; this imposes an additional power loss. Thus, the energy used in commercial cells amounts to about 130 to 160 kwhr per thousand standard cubic feet of hydrogen produced.

A disadvantage of producing hydrogen by the electrolysis of water is that the cost is substantially higher than the steam-hydrocarbon process.

Recently there has been proposed a thermochemical hydrogen process which uses calcium bromide and mercury to decompose water. The temperature required is about 727° C, which is a temperature attainable in the steam discharged from a high temperature gas reactor. A disadvantage of this process however, is the high cost of volatility of mercury. Specifically, the loss of significant amounts of mercury to the atmosphere would appear to be certain to occur in the course of continuous operation, adding to the expense of the process and creating a potentially severe ecological hazard.

U.S. Pat. No. 3,839,550 discloses a cyclic process for the production of hydrogen from water. The process comprises the steps of hydrolyzing lithium iodide to produce lithium hydroxide and hydriodic acid in a reaction zone and removing the hydriodic acid from the reaction zone; the remaining aqueous lithium hydroxide is then reacted with iodine to produce an aqueous mixture of lithium iodide and lithium iodate. The lithium iodate is separated from the lithium iodide and reacted in the presence of water with a metal selected from the group consisting of potassium, rubidium and cesium to form a selected metal iodate. The selected metal iodate is thermally decomposed to produce oxygen and the selected metal iodide, the latter of which is recycled for reaction with additional lithium iodate. The hydriodic acid is converted to hydrogen and iodine, the hydrogen being continuously removed as the product, and the iodine being recycled for reaction with aqueous lithium hydroxide. This process is somewhat complex and has not yet been proven to be commercially economic.

A process for producing hydrogen from the disassociation of a hydrogen halide is disclosed in U.S. Pat. No. 3,365,276. Broadly, the claimed process comprises heating a hydrogen halide to a temperature above 600° F in a first zone in the presence of a hydrogen permeable membrane to disassociate the hydrogen and the halogen. A pressure differential is maintained across the hydrogen permeable membrane such that the hydrogen produced passes through the hydrogen permeable membrane for recovery. A disadvantage to this process is that it requires a substantial amount of thermal energy to effect the disassociation of the hydrogen halide.

SUMMARY OF INVENTION

In accordance with the present invention there is provided a two-step method of producing hydrogen. Broadly, the first step comprises reacting an ash containing carbonaceous material, water (or water vapor) and at least one halogen selected from the group consisting of chlorine, bromine and iodine to form reaction products including $CO_2$, a corresponding hydrogen halide and the ash constituents of the carbonaceous material substantially free of any unreaced carbon and containing minor amounts of the selected halogen. The reaction may be represented by the following exemplary equation: $C + 2H_2O + 2X_2 \rightarrow 4HX + CO_2$ where X is the halogen. In addition, when the carbonaceous material is one which includes hydrogen (which is not chemically bound with oxygen in the form of water) such as coal, that hydrogen reacts with the halogen to form additional hydrogen halide.

In the second step the hydrogen halide is decomposed to release the hydrogen and the halogen; the hydrogen being recoverable as a salable product and the halogen being recovered for recycle to the first step for reaction with additional carbonaceous material and water. Thus, the overall reaction may be exemplified by the following equation:

$$C + 2H_2O \rightarrow 2H_2 + CO_2$$

In accordance with one embodiment of the invention, both steps are performed in a single reaction zone. In another embodiment, the first step is performed in one zone and the second step is performed in another zone. Obviously, in accordance with either embodiment, the method may be practiced intermittently as a batch operation or as a continuous operation. Generally, if a continuous method is desired the two-zone embodiment is preferred.

The decomposition of the hydrogen halide may be accomplished thermally or electrolytically. The electrolytic decomposition generally is preferred for economic reasons.

It also has been found that a small amount (usually from about 0.1% to as high as 20%) of the halogen selected will react with and be retained in the ash constituents of the carbonaceous feed material. The loss of such an amount of halogen would seriously detract from the economic viability of the present invention. In addition it would represent a source of undesirable pollution if the ash is to be disposed of as waste. In accordance with the present invention, therefore, there also is provided a means for recovery of the valuable halogen constituent for recycle to the method. In the particularly preferred embodiment the halogen containing ash is reacted with sulfuric acid to form a hydrogen halide for recycle to the hydrogen halide decomposition step.

BRIEF DESCRIPTION OF THE DRAWING

The sole FIGURE is a schematic flow diagram of a method for the production of hydrogen in accordance with the present invention.

DESCRIPTION OF THE PREFERRED EMBODIMENTS

In accordance with the present invention a carbonaceous material, water, and at least one halogen selected from the group consisting of chlorine, bromine and iodine are reacted to form reaction products including $CO_2$ and a corresponding hydrogen halide. It will be appreciated that the foregoing reaction to produce a hydrogen halide is not novel per se. It has not, however, been suggested or used heretofore as a part of a method for producing hydrogen in which the only material requirements are a source of carbon and water.

The ash containing carbonaceous materials, suitable for use in accordance with the present invention, include fuels such as carbon, charcoal, and various carbon-containing materials, such as coal, petroleum, coke, lignite, and the like. Various petroleum by-products also may be utilized as a source of carbon in the present invention. Typical of such petroleum by-products are the petroleum residuums, asphalts, and asphaltines. In addition, various waste materials are suitable sources of carbon, such as agricultural wastes including corn cobs, cane stalks, wood shavings, pulp, sawdust, animal waste and urban waste such as paper and cardboard. Sewage sludge resulting from municipal treatment plants which process waste water beyond the primary step, also is a suitable source of carbonaceous material for the present invention. Another source of suitable material is plastic, or the scraps or wastes formed in the production of a plastic, plastic fiber such as polyvinyl chlorides, polyenthylene, cellulose acetate, polyamide, and the like.

In addition to the foregoing materials, which generally contain ash constituents in some greater or lesser degree, it will be apparent to those versed in the art that the invention also is applicable to non-ash-containing fuels such as carbon monoxide, ethane and other substantially pure hydrocarbon materials. Thus, it is seen that substantially any fuel or waste material containing carbon, with the exception of $CO_2$, provides a suitable source of carbonaceous feed material for use in accordance with the present invention.

The term "ash-containing" carbonaceous material as used herein refers to carbonaceous materials as hereinbefore described, which in addition to carbon also contain various amounts of metal constituents such as aluminum, iron, silica, and the like. Such constituents or impurities vary in type and quantity, depending upon the particular material selected. For example, in the case of coal, the most common ash constituents are aluminum, iron and silicon, which may be present in amounts up to about 15%. In certain crude petroleum products the principal impurities are metals such as iron, vanadium, and even small amounts of molybdenum. The precise identity and quantity of the various ash constituents are readily determinable either from the producer of the material, available literature sources, or from combustion and analysis of the ash products of the carbonaceous material. Generally, such ash constituents will comprise from as low as a few tenths of a percent in the case of certain petroleum products to as high as from about 1 to 15% in the case of coal. Thus, in accordance with the present invention, the term "ash-containing carbonaceous material" contemplates all the aforementioned materials having ash contents of from about 0.1% to 20%.

It must be appreciated that in addition to its use as a method of producing hydrogen, the present invention, also is applicable to the destruction of hazardous waste materials such as pesticides, herbicides, and the like, containing organic carbon compounds, including various halogenated organic compounds, such as malathion, and the like. Specifically, in accordance with the present method, such waste hazardous material will be halogenated or reacted with a halogen to produce a hydrogen halide, which subsequently is decomposed; the halide being recovered for recycle. In such instance hydrogen production may be of secondary or even of no importance. Thus, where the destruction of the hazardous material is of principal interest, the hydrogen could either be combusted or vented to the atmosphere with little or no deleterious effect on the environment.

The pressure and temperature conditions for the reaction between water, carbonaceous material, and halogen are not critical, providing of course that the temperature is above the freezing point of water. Generally, the reaction proceeds more rapidly at higher temperatures; thus, higher temperatures are preferred. When it is desired to maintain the reaction in a liquid phase at elevated temperatures, it is of course necessary that the reaction be carried out at an elevated pressure. Generally, temperatures within the range of from about 100° to about 375° C, and a pressure of from 5 to 400 atmospheres have been found satisfactory. Particularly good results have been obtained with a temperature within the range of from about 150° to 300° C, and a pressure of from about 10 to about 100 atmospheres; thus, such temperature and pressures are particularly preferred.

The time required for the coal, carbonaceous feed material, water and halogen to react will vary, or course, depending on the specific feed material utilized, the halogen utilized, and the temperature of the reaction.

It has been found that when the present method is practiced in accordance with the foregoing particularly preferred operating conditions, that contrary to the teachings of U.S. Pat. No. 1,870,308 an active or activated carbon feed is not required. Further, the use of a pre-treated feed material or catalyst as taught in U.S. Pat. No. 2,238,896 and U.S. Pat. No. 3,761,579, respectively, is not required.

It is an advantage of the present invention that it is substantially non-polluting. More particularly, if the carbonaceous feed material contains sulfur, for example, it is retained in the liquid reaction products as a sulfate or as a sulfuric acid. If the carbonaceous feed material contains any halide or hydrogen constituents they will react to form additional hydrogen halide products. Any nitrogen constituents of the carbonaceous feed material generally are released as elemental nitrogen, which may of course be emitted to the atmosphere. The gaseous carbon dioxide product of reaction also may be safely vented to the atmosphere. In addition, the ash constituents of the carbonaceous feed material are retained in the liquid reaction product and are readily recoverable therefrom utilizing standard liquid-solids separation techniques, such as filtration, settling, centrifuging, and the like.

The hydrogen halide produced in the first step of the method of the present invention subsequently is decomposed to release the hydrogen for recovery as a salable product and the halogen for recycle to the first step for reaction with additional carbonaceous material. The hydrogen halide may be decomposed either thermally or electrochemically. Thermal decomposition requires a source of high temperature thermal energy (from about 1000° to 3000° C, depending upon the specific halogen), and therefore is not preferred. Rather, the preferred mode of decomposition is electrolytic. The advantages of electrolytic decomposition of the hydrogen halide will be more clear with reference to the following Table 1 wherein the theoretical decomposition voltage of water and the hydrogen halides is set forth for purposes of comparison.

TABLE 1

| Compound | Theoretical Decomposition Potential at 25° C (volts) | % of Theoretical Decomposition of $H_2O$ |
|---|---|---|
| $H_2O$ | 1.229 | 100 |
| HF | 2.797 | 227 |
| HCl | 0.986 | 80 |
| HBr | 0.555 | 45 |
| HI | 0.013 | 1.1 |

From the foregoing table it is seen that hydrogen fluoride is more difficult to decompose than water. Therefore, the halogens for use in the practice of the present invention are chlorine, bromine, and iodine. The decomposition potential of hydrogen chloride is only slightly less than that of pure water, therefore, it is the least preferred of the three halogens. The theoretical decomposition potential of hydrogen bromide, on the other hand, is only about 45% of that of water and hydrogen iodide is only about 1.1%.

The electrical potential required to decompose an aqueous solution of a hydrogen halide decreases as the temperature of the aqueous solution increases. Accordingly, it is preferred to practice the electrolytic decomposition at a temperature of from about 50° to 300° C, and preferable from about 100° to about 250° C. The pressure in the electrolytic decomposition zone is maintained sufficiently high to maintain the aqueous hydrogen halide in a liquid phase. Generally the pressure will be within a range from about 5 to about 100 atmospheres.

The particular apparatus used in the decomposition of the hydrogen halide is not critical. Substantially, the same apparatus and techniques that are utilized in the electrolytic decomposition of water can be used with the method of the present invention. Certain changes in the materials of construction will be required since the hydrogen halides are substantially more corrosive than water. However, the selection of appropriate materials is well within the skill of those versed in the art to which this invention applies.

It is another advantage of the present invention that substantially little, or in some cases, no external heat is required to maintain the desired reaction temperatures in each step. More particularly, the reaction of carbonaceous material, water, and halogen is exothermic, and in many instances sufficient to supply all the heat required to maintain the desired temperatures in the first reaction zone, or in the first step, and further provide an aqueous hydrogen halide solution having a temperature within the range of that preferred for the electrolytic decomposition step. Thus, the only significant amount of energy required for production of hydrogen in accordance with the present method is electrical energy for the electrolytic decomposition. That electrical energy requirement is substantially less than that required for the electrolytic decomposition of water.

It is an essential feature of the present invention that the ash constituent of the carbonaceous material be treated to recover the halogen, which is contained therein, the majority of which is present as a halide of the metal ash constituent. If the halogen is allowed to remain in the ash as a halide of the metal constituent, it would present a pollution problem, since the metal halides are relative soluble, and thus could be washed or leached away into the ground waters, polluting streams and the like. In addition, the loss of halogen from the method is economically undesirable. Even though the loss is a relatively small percentage of the total halogen used, it is estimated that a loss of one-hundredth of a percent of the halogen used in the cycle would add approximately 1.5% to the overall processing costs for producing hydrogen. Thus, for the present method to be economically viable, it is an essential feature that substantially all of the halogen be recovered from the ash constituents.

In accordance with the present invention, this is accomplished by reacting the halogen-containing ash constituent with sulfuric acid to produce a sulfate of the ash constituent and hydrogen halide for recycle to the method. The temperature and concentration of sulfuric acid are not particularyly critical, however, excessively high temperatures or too strong a concentrated sulfuric acid should be avoided to suppress a potential side reaction of sulfuric acid with the hydrogen halide produced, which would form elemental halogen, sulfur dioxide gas and water. This side reaction, while still permitting recover of the halogen, results in the use of excessive sulfuric acid in addition to the formation of undesirable sulfur dioxide. Generally, a sulfuric acid concentration of from about 0.1 to 60%, and preferably from 1 to 10%, is preferred, while the temperature may range from as low as about 0° C up to about 300° C. It also will be appreciated by those versed in the art that acids other than sulfuric acid could be used. For example, strong phosphoric acid could be used, however, the cost of the other applicable acids are substantially higher than for sulfuric. Therefore, in the interest of economics, sulfuric acid is preferred.

The following examples are set forth to further illustrate the method of the present invention.

EXAMPLE 1

A series of experiments were performed to demonstrate the reaction between a carbonaceous material, water and a selected halogen to produce the product hydrogen halide. Various carbonaceous materials, water, and either bromine or iodine were reacted in a sealed vessel at different temperatures and for different lengths of time as set forth in the table below. The halogen is provided in an amount such that it was the stoichiometrically limiting reactant in these experiments. The results are as set forth in table 2.

TABLE 2
YIELD OF HYDROGEN HALIDE FROM REACTION OF CARBON WITH WATER AND HALOGEN

| Reaction Temp. (° C) | Halogen Reactant | Carbon Reactant | Reaction Time (Hours) | Percent of Halogen Converted to HX* |
|---|---|---|---|---|
| 75  | $I_2$  | Charcoal | 15 | 3.3 |
| 127 | $I_2$  | Charcoal | 1  | 3.9 |
| 127 | $I_2$  | Charcoal | 3  | 6.3 |
| 127 | $I_2$  | Charcoal | 68 | 7.8 |
| 127 | $I_2$  | Petroleum Coke | 15 | 3.2 |
| 127 | $I_2$  | Coal | 1  | 10 |
| 127 | $I_2$  | Coal | 2  | 22 |
| 127 | $I_2$  | Coal | 3  | 29 |
| 152 | $I_2$  | Coal | 10 | 57 |
| 127 | $Br_2$ | Charcoal | 15 | 76 |
| 127 | $Br_2$ | Coal | 1  | 89 |
| 127 | $Br_2$ | Coal | 2  | 91 |
| 127 | $Br_2$ | Coal | 3  | 94 |
| 152 | $Br_2$ | Coal | 10 | 96 |

*The yield of hydrogen halide (HX) is the percent of the halogen reacting to form HX.

From the foregoing table it is seen that the reaction between bromine and the carbonaceous material is substantially more rapid than for iodine. In addition, bromine is substantially lower in cost than iodine. Thus, bromine is the particularly preferred halogen, even though its electrolytic decomposition voltage is higher than that of iodine.

EXAMPLE 2

This example demonstrates the effect of temperature on the rate of reaction of coal, water, and bromine. Reactions were carried out for various lengths of time at temperatures of 155°, 250° and 300° C, and the yield of HBr was determined and compared with the theoretical yield from the coal utilized. The results are summarized in Table 3.

TABLE 3
EFFECT OF TEMPERATURE ON THE YIELD OF HYDROGEN BROMINE FROM REACTION OF COAL WITH BROMINE AND WATER

| Reaction Temperature (° C) | Time (Hours) | Yield of HBr (%) |
|---|---|---|
| 155 | 2 | 35 |
| 155 | 18 | 43 |
| 155 | 42 | 52 |
| 155 | 68 | 58 |
| 155 | 100 | 59 |
| 250 | 2 | 58 |
| 250 | 10 | 62 |
| 250 | 58 | 75 |
| 250 | 72 | 80 |
| 250 | 100 | 80 |
| 300 | 0.25 | 96 |
| 300 | 0.50 | 97 |
| 300 | 1 | 98 |
| 300 | 24 | 99 |
| 300 | 72 | 99.5 |

These examples demonstrate that substantial yields of the hydrogen bromide intermediate are obtainable in a relatively short time at the preferred temperature range of from about 250°–300° C,

EXAMPLE 3

This example demonstrates the effect of different types of coal on the reaction with water and bromine. The reaction was carried out at 300° for a period of 15 minutes with bituminous, sub-bituminous and lignite coals, the latter containing 30% by weight water without pre-treatment. The yield calculated on the basis of standard cubic feet of hydrogen per ton of coal is given in Table 4.

TABLE 4
YIELD OF HYDROGEN FROM VARIOUS TYPES OF COALS

| Type of Coal | Carbon Content (wt.%) | Hydrogen Content (wt.%) | Water Content (wt.%) | Hydrogen Yield (scf/ton coal) | Hydrogen Yield (%)* |
|---|---|---|---|---|---|
| Bituminous | 60.32 | 4.16 | 9.01 | 96,800 | 98 |
| Sub-bituminous | 59.64 | 4.16 | 1.03 | 96,000 | 98 |
| Lignite | 44.36 | 6.24 | 30.51 | 84,800 | 99 |

*Based on the total available hydrogen and carbon in the coal.

These results demonstrate the adaptability of the method of the present invention to a wide variety of coals, particularly lignite without prior removal of water.

EXAMPLE 4

This example demonstrates the effect of different types of carbonaceous materials on the reaction with water and bromine to form hydrogen bromide which is then decomposed by electrolysis to form the product hydrogen and regenerate the bromine reactant. As an example, wood, paper, corncobs, feedlot wastes, sewage sludge, etc. have been reacted with bromine and water at from 250° C to 300° C to obtain hydrogen bromide. The calculated yields of hydrogen are given in Table 5.

TABLE 5
YIELDS OF HYDROGEN FROM REACTION WITH CARBONACEOUS MATERIALS

| Type of Carbonaceous Material | Hydrogen Yield scf/ton Waste (dry basis) |
|---|---|
| Paper (newsprint) | 52,000 |
| Wood (Douglas fir) | 51,000 |
| Corncobs | 54,000 |
| Feedlot waste | 48,000 |

TABLE 5-continued

| YIELDS OF HYDROGEN FROM REACTION WITH CARBONACEOUS MATERIALS | |
|---|---|
| Type of Carbonaceous Material | Hydrogen Yield scf/ton Waste (dry basis) |
| Sewage sludge | 53,000 |

From the foregoing table it is seen that the present invention provides a hydrogen production method which is applicable to a wide variety of carbonaceous feed materials.

EXAMPLE 5

This example demonstrates the electrolysis of an aqueous hydrogen bromide solution and the effect of temperature on the electrolytic decomposition potential of such a solution. A hydrogen bromide-water azeotrope (approximately 47 wt.% hydrogen bromide) was placed in an electrolytic cell and its decomposition potential determined at various temperatures. A potential was applied to the electrolytic cell and increased stepwise until a substantial increase in current flow was observed. That potential was then considered to be the decomposition potential for the solution at that particular temperature. The results of the tests are set forth in Table 6.

TABLE 6

| DECOMPOSITION POTENTIAL OF HBr-$H_2$O AZEOTROPE | |
|---|---|
| Decomposition Potential (volts) | Temperature (° C) |
| 0.75 | 15 |
| 0.56 | 25 |
| 0.50 | 49 |
| 0.45 | 80 |
| 0.41 | 115 |
| 0.39 | 125 |

From the foregoing table it is seen that the decomposition potential for the aqueous solution of hydrogen bromide is substantially less than that for water. Further, the foregoing table demonstrates that the decomposition potential decreases with increasing temperature. Extrapolating the data in the table, it is seen that a hydrogen bromide solution is decomposable at a potential as low as about 0.2 volts at a temperature of about 250° C. Thus, the preferred temperature for decomposition of the preferred hydrogen-bromide solution is within a range of from about 100° to 250° C. In accordance with the present invention the particularly preferred hydrogen bromide solution is decomposable within the temperature range from 100° to 250° C at an applied potential of from about 0.4 to 1.0 volt, such voltage being sufficient to maintain a current density of from about 100 to 800 ma/cm². The calculated cost of producing hydrogen in accordance with the particularly preferred embodiments set forth herein is approximately one third to one half that of a conventional water electrolysis process. Thus, this example clearly demonstrates the economic viability of the method of the present invention.

EXAMPLE 6

The following example demonstrates the amount of halogen compound which is lost to the ash constituents of some typical carbonaceous materials and the recovery of said halogen constituent therefrom. A series of four different ash-containing carbonaceous materials were reacted in an aqueous solution with bromine. Thereafter, the aqueous solution was filtered to recover the solid ash constituents, and the ash constituents analyzed for bromine content. The results are as set forth in Table 7 below.

TABLE 7

| Bromine Losses to Ash (expressed as percent of total bromine used) | | |
|---|---|---|
| Feedstock | Insoluble | Soluble |
| Lignite (North Dakota) | 0.0012 | 0.37 |
| Bituminous Coal (Kentucky No. 9) | 0.0008 | 0.63 |
| Wood Wastes (Douglas Fir) | 0.0011 | 0.26 |
| Sewage Sludge (Air Dried Cake) | 0.0019 | 0.30 |

From the foregoing table it is seen that the bromine losses in the soluble ash constituents (metal halides) are significant. Indeed, for the foregoing carbonaceous materials, it is estimated that the bromine replacement cost would approach the other overall process cost. Hence, it is seen that the recovery of the halogen (bromine) is essential for a commercially viable project.

The soluble ash from the foregoing reactions were treated with an aqueous solution containing 5 wt. % sulfuric acid and heated to a temperature of about 100° C, to form hydrogen bromide and metal sulfates. The hydrogen bromide was then distilled and collected. The ash (metal sulfates) resulting from this treatment was analyzed for bromine content. The results are set forth in Table 8 below.

TABLE 8

| Bromine Content of Ash After Sulfuric Acid Treatment | |
|---|---|
| Feedstock | Bromine Losses to Soluble Ash After Treatment (Expressed As Percent of Total Bromine Used) |
| Lignite (North Dakota) | 0.0014 |
| Bituminous Coal (Kentucky No. 9) | 0.00059 |
| Wood Wastes (Douglas Fir) | 0.00048 |
| Sewage Sludge (Air Dried Cake) | 0.00039 |

From the foregoing table it is seen that a substantial reduction of the bromine content of the soluble ash was brought about by the sulfuric acid treatment. The bromine losses in these typical examples were reduced to as low as about 0.001%. Thus, the cost to replace the bromine lost in the ash has been reduced to a small fraction of the overall method cost.

EXAMPLE 7

The following example demonstrates a particularly preferred embodiment of the method of the present invention, utilizing separate reaction zones for each step. More particularly, with reference to the drawing, the present invention will be described with respect to the particularly preferred source of carbonaceous material, namely an ash and sulfur containing coal, and the particularly preferred halogen, bromine.

Coal is introduced into a halogenation zone 10 at a rate of 3.9 tons per hour via a conduit 12. The coal used is an Illinois seam coal, having an approximate empirical composition of $C_{5.7}H_5O_{0.4}N_{0.07}S_{0.13}$ and containing about 12 wt.% ash. A liquid phase consisting of dilute hydrogen bromide in water and containing dissolved bromine is brought into the halogenation zone via a conduit 16 and 18 from a source to be described. Water also is introduced into halogenation zone 10 in an amount of about 15,000 pounds per hour via a conduit 14 and conduit 18. Halogenation zone 10 is maintained at a temperature of about 300° C and a pressure from 1000 to 1800 psi. Gaseous reaction products comprising $CO_2$ (19,500 lb/hr) and nitrogen (82 lb/hr) are withdrawn via a conduit 20. A major portion of the insoluble ash constituents of the coal settle to the bottom of halogenation zone 10 and are withdrawn via a conduit 24 for disposal. An aqueous solution of the hydrogen bromide reaction product formed in halogenation zone 10 is withdrawn via a conduit 22, passed through a filter 23 to remove suspended solids, and introduced via a conduit 25 into a decomposition zone 26. The aqueous solution comprises 219,000 lb/hr HBr, 197,200 lb/hr $H_2O$, and 5,000 lb/hr $H_2SO_4$. The sulfuric acid is generated in situ from the sulfur constituent of the coal and displaces the halogen that otherwise would be retained in the ash. In decomposition zone 26 the aqueous solution is electrolytically decomposed at a temperature of about 250° C and under a pressure from about 500 to 1800 psi. The electrical power requirements to provide a desired decomposition potential of from about 0.4 to about 1.0 volt and a current density from 100 to 800 $ma/cm^2$ is from about 10,500 KW to about 26,250 KW.

Gaseous hydrogen is produced in decomposition zone 26 at a rate of about 2150 lb/hr and withdrawn via a conduit 30 for recovery as a salable product. A solution depleted in hydrogen and containing dissolved bromine is withdrawn from decomposition zone 26 via conduit 16 and returned to the halogenation zone for reaction with additional carbonaceous material. The solution comprises 45,000 lb/hr HBr, 197,200 lb/hr $H_2O$, 172,600 lb/hr dissolved bromine, and 5,000 lb/hr $H_2SO_4$.

Advantageously a side stream of the solution (about 20%) is withdrawn via a conduit 32 and introduced into an ash and $H_2SO_4$ removal zone 34 for removal of dissolved impurities such as ash and metal sulfates, and recovery of the sulfuric acid. In ash and $H_2SO_4$ removal zone 34 the solution is cooled to precipitate a substantial portion of the dissolved impurities such as metal sulfates which are removed along with any other suspended solid ash constituents, utilizing conventional solid-liquid separation techniques, such as filtration, centrifuging and the like. These solids are removed via a conduit 36 for disposal. The solids-free solution is heated to vaporize the water and hydrogen halide leaving a solution of substantially pure $H_2SO_4$, which is removed from zone 34 via a conduit 38 for recovery as a salable product. The vaporized water and hydrogen halide, free of ash and $H_2SO_4$, is condensed and returned to conduit 16 via a conduit 40. Thus, it is seen that the method of the present invention provides a continuous, substantially non-polluting, economical method of producing a substantially pure hydrogen product, utilizing a relatively plentiful carbonaceous feed material. Further, the sulfur which would be a pollutant if the carbonaceous material were burned is utilized to prevent loss of the valuable halogen and produce a surplus of $H_2SO_4$ as a salable product.

Although the present invention has been described with respect to various specific carbonaceous materials, it will be readily apparent that substantially any other carbon containing material will be equally suitable for use in accordance with the present method. Further, although the invention has been described in connection with preferred embodiments, temperatures, and pressures, numerous variations thereof will be apparent to those versed in the art. Thus, the present invention should not be construed as limited by the foregoing illustrative examples and descriptions. Rather, its scope should be determined in accordance with the following claims.

What is claimed is:

1. A method of producing hydrogen comprising the steps of:
   (a) reacting an ash containing carbonaceous material, water and at least one halogen selected from the group consisting of chlorine, bromine, and iodine to form reaction products including $CO_2$, a corresponding hydrogen halide, and ash constituents substantially free of carbonaceous material and containing a minor amount of said halogen;
   (b) decomposing the hydrogen halide to produce separate streams of hydrogen and halogen;
   (c) recovering the halogen and returning it to step (a) for reaction with additional carbonaceous material and water; and
   (d) treating the ash constituents with sulfuric acid to react with said halogen and form a hydrogen halide for recycle to step (b).

2. A method of producing hydrogen comprising the steps of:
   (a) providing a body of an ash containing carbonaceous material in a reaction zone maintained at an elevated temperature;
   (b) reacting said carbonaceous material with water vapor and at least one gaseous halogen selected from the group consisting of chlorine, bromine and iodine, to form reaction products including $CO_2$, a corresponding hydrogen halide, and the ash constituents of the carbonaceous material, substantially free of any unreacted carbonaceous material and containing minor amounts of the halogen;
   (c) separating said hydrogen halide from said $CO_2$ and decomposing the hydrogen halide in a separate reaction zone to produce separate streams of hydrogen and halogen;
   (d) recovering the halogen from step (c) and returning it to step (a) for reaction with additional carbonaceous material and water; and
   (e) separating the halogen containing ash constituents and reacting them with sulfuric acid to form a hydrogen halide for recycle to step (c).

3. A method of producing hydrogen comprising the steps of:
   (a) reacting an ash containing carbonaceous material in an aqueous solution of a halogen selected from the group consisting of chlorine, bromine and iodine in a reaction zone and effecting a reaction in the aqueous solution to form reaction products including $CO_2$, an aqueous solution of a corresponding hydrogen halide and the ash constituents of the carbonaceous material substantially free of unreacted carbon and containing minor amounts of the halogen;
   (b) withdrawing at least a portion of the aqueous solution from step (a) and introducing it into a second zone, wherein the aqueous solution is decomposed to produce hydrogen;
   (c) returning the aqueous solution from the second zone, still containing the halogen, to the first zone for reaction with additional carbonaceous material; and
   (d) treating the halogen containing ash with sulfuric acid to form a hydrogen halide for recycle to step (b).

4. The method of claim 1 wherein said selected halogen is bromine.

5. The method of claim 1 wherein the hydrogen halide is in an aqueous solution and is introduced into an electrochemical cell containing positive and negative electrodes and decomposed electrolytically by maintaining an electrical potential between the electrodes of from about 0.4 to about 1.0 volt and a current density of from about 100 to 800 amp/ft$^2$.

6. The method of claim 1 wherein the temperature and pressure within the reaction zone are maintained within a range of from about 100° to 400° C and from about 5 to 225 atmospheres, respectively.

7. The method of claim 1 wherein said ash containing carbonaceous material is selected from the group consisting of lignite and coal.

8. The method of claim 1 wherein said ash containing carbonaceous feed material contains sulfur constituents which are retained in the aqueous solution, and said hydrogen is recovered substantially free of any sulfur.

9. The method of claim 3 wherein said selected halogen is bromine.

10. The method of claim 9 wherein the hydrogen halide is in an aqueous solution and is introduced into an electrochemical cell containing positive and negative electrodes and decomposed electrolytically by maintaining an electrical potential between the electrodes of from about 0.4 to about 1.0 volt and a current density of from about 100 to 800 amp/ft$^2$.

11. The method claim 10 wherein the temperature and pressure within the reaction zone are maintained within a range of from about 100° to 400° C and from about 5 to 225 atmospheres, respectively.

12. The method of claim 11 wherein said ash containing carbonaceous feed material contains sulfur constituents which are retained in the aqueous solution, and said hydrogen is recovered substantially free of any sulfur.

13. The method of claim 12 wherein said ash containing carbonaceous material is selected from the group consisting of lignite and coal.

14. The method of claim 11 wherein said ash containing carbonaceous material is a carbon-containing waste.

* * * * *